US010640996B2

(12) United States Patent
Hartman

(10) Patent No.: US 10,640,996 B2
(45) Date of Patent: May 5, 2020

(54) HOLE COVER

(71) Applicant: Michael Hartman, Carson, CA (US)

(72) Inventor: Michael Hartman, Carson, CA (US)

( * ) Notice: Subject to any disclaimer, the term of this patent is extended or adjusted under 35 U.S.C. 154(b) by 0 days.

(21) Appl. No.: 14/841,250

(22) Filed: Aug. 31, 2015

(65) Prior Publication Data

US 2018/0163418 A1    Jun. 14, 2018

(51) Int. Cl.
*E04G 21/32* (2006.01)
*F16L 55/11* (2006.01)
*E04G 15/06* (2006.01)
*E04B 5/32* (2006.01)

(52) U.S. Cl.
CPC ......... *E04G 21/32* (2013.01); *E04G 21/3204* (2013.01); *F16L 55/1141* (2013.01); *E04B 5/32* (2013.01); *E04B 2103/02* (2013.01); *E04G 15/06* (2013.01)

(58) Field of Classification Search
CPC ....... F16B 21/086; E04G 21/32; E04G 15/06; E04G 21/3204; E04B 2103/02; E04B 5/32; F16L 55/1141
USPC ............ 52/301; 411/508, 900–904; 220/287, 220/307, 787, 800–801
See application file for complete search history.

(56) References Cited

U.S. PATENT DOCUMENTS

| | | | |
|---|---|---|---|
| 2,552,917 A | 5/1951 | Becker | |
| D224,668 S | 8/1972 | Burger, III | |
| 5,046,223 A * | 9/1991 | Kraus | F16B 21/086 24/297 |
| 5,454,479 A * | 10/1995 | Kraus | B62D 25/24 220/787 |
| 5,499,737 A * | 3/1996 | Kraus | F16B 21/086 138/89 |
| 6,360,779 B1 | 3/2002 | Wagner et al. | |
| 6,745,530 B2 * | 6/2004 | Nesbitt | E04H 17/20 52/300 |
| D571,899 S | 6/2008 | Gilligan | |
| 7,581,361 B1 | 9/2009 | Murkland | |
| 7,992,033 B2 | 4/2011 | Kearby et al. | |
| D638,103 S | 5/2011 | Roll | |
| 2005/0116060 A1 | 6/2005 | Borunda | |
| 2008/0168719 A1 | 7/2008 | Borunda | |
| 2008/0236691 A1* | 10/2008 | Roll | F16L 55/1141 138/92 |
| 2010/0196091 A1* | 8/2010 | Selle | F16B 5/0628 403/409.1 |
| 2013/0164099 A1* | 6/2013 | Rosemann | B60R 13/0206 411/508 |

* cited by examiner

*Primary Examiner* — Brian E Glessner
*Assistant Examiner* — Adam G Barlow
(74) *Attorney, Agent, or Firm* — Steins & Associates, P.C.

(57) ABSTRACT

A Hole Cover for penetrations in commercial construction floors. One size of hole cover can accommodate a wide variety of hole diameters, and fit snugly. The device is made from a lightweight, yet durable material. A version having a cap with an internal metal core is also available.

12 Claims, 10 Drawing Sheets

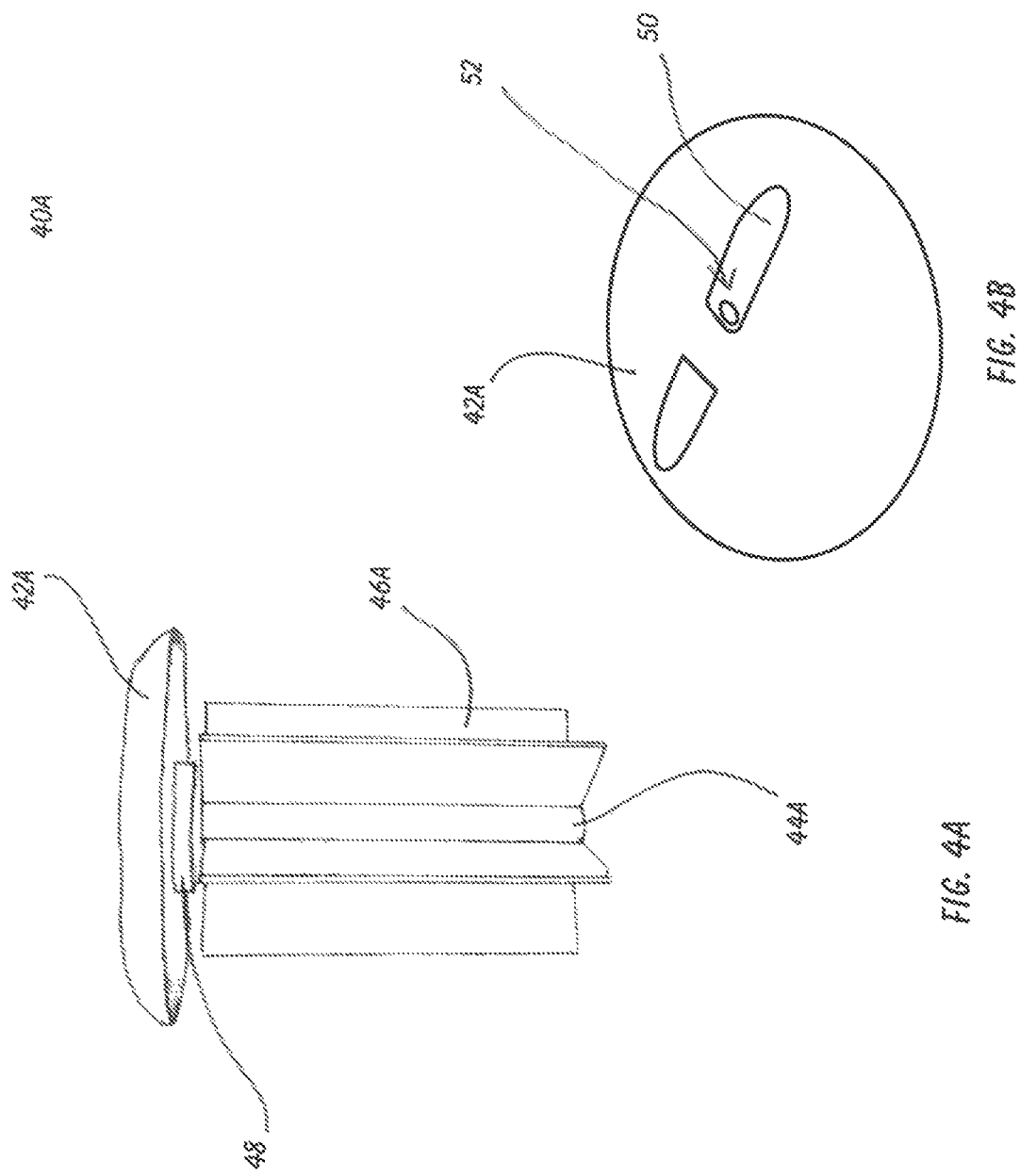

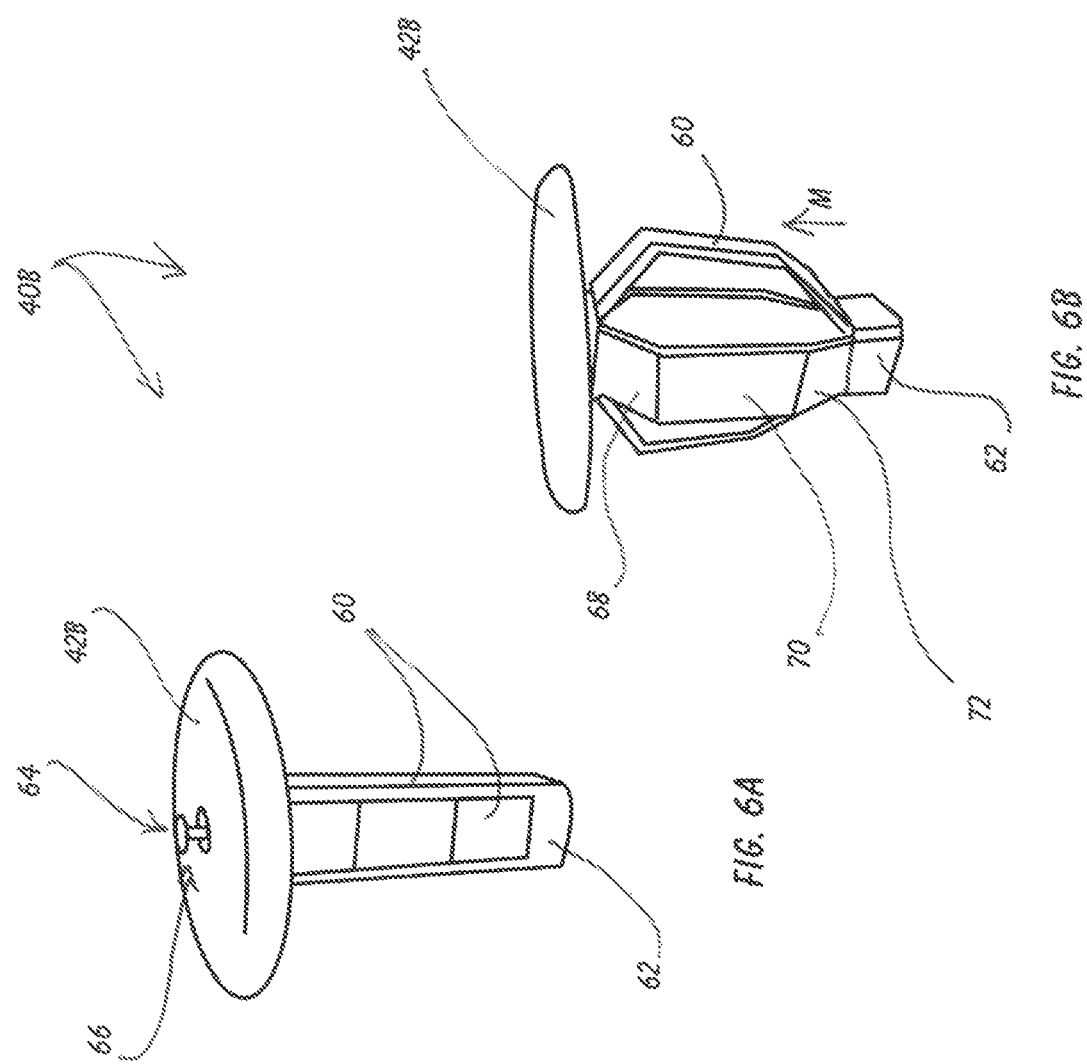

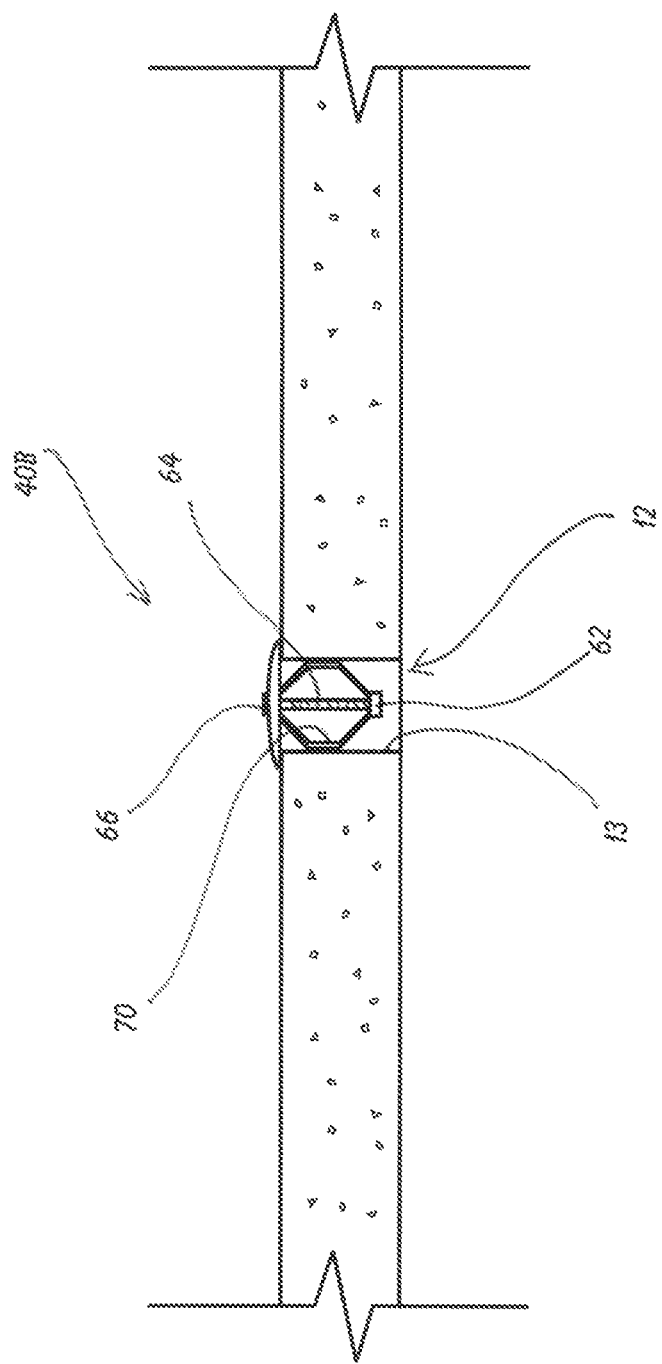

HOLE COVER

This application is filed within one year of, and claims priority to Provisional Application Ser. No. 62/191,150, filed Jul. 10, 2015.

BACKGROUND OF THE INVENTION

1. Field of the Invention

This invention relates generally to construction safety apparatus and, more specifically, to a Hole Cover.

2. Description of Related Art

Large construction projects involving the erecting of multi-floored commercial buildings generally include the structural feature of poured concrete floors. The concrete floors provide excellent durability and stability, and furthermore, allow great flexibility in configuring and re-configuring interior walls, because the vast majority of them are non-structural. However, the use of concrete for the floors includes some inherent challenges during the completion stages of the building (as well as during later improvement projects). Once the concrete has been poured and cured, it is difficult and expensive to cut new holes or penetrations through them. In order for required plumbing, wiring, and other infrastructure components to pass between building levels, it is necessary that numerous penetrations be provided through the concrete floors. Consequently, quite a number of penetrations are created in the forms prior to the concrete being poured. Until the interior (typically non-structural) walls are built, therefore, virtually all of these penetrations are out in the open. These open penetrations would provide a great safety risk to workers at the site during construction (e.g. tripping and falling); this risk is prohibited by regulation, and regular site inspections will result in citation if unprotected penetrations are discovered.

As shown in FIG. 1, a partial cutaway side view of the generic concrete floor 10, a penetration 12 is a generally circular bore formed to extend between the top surface 11A and the bottom surface 11B of the floor 10. The floor 10 typically has a thickness T(F) of between four and six inches (4" to 6"). Penetrations 12 can be of a variety of diameters D(P), depending upon their intended purpose, but they generally range between two (2) inches and eight (8) inches in diameter. It is not uncommon that there be several hundred of these penetrations 12 in any multi-level commercial building. As discussed above, each of these penetrations 12 must be covered in order to prevent personal injuries or citations from inspectors.

There have been several attempts over the years at solving the expense and inconvenience of plugging (and unplugging) these floor penetrations 12. One example was presented by P. D. Becker in U.S. Pat. No. 2,552,917. The "Universal Plug Button" of Becker is a simple device defined by two components—the cap 24 (designed to cover the penetration in the deck 22), and the fastener members 26 extending beneath the deck 22 (or wall). The problem with the Becker device is that its two-part design includes fastener members 26 formed from one piece of spring-type metal, while the cap 24 is made from a hardened metal to insure that it is of the requisite durability. The fact that these two elements are made from treated metal adds substantial cost to the device 20. Due to the sheer number of penetrations [12] that need to be plugged, it is critical to maintain the lowest per-item cost as is possible. Also, the Becker design is not sufficiently adjustable to differently-sized holes [12]—this means that the builder must have a whole range of sizes of buttons 20, with each particular size of button 20 only suitable for one diameter of hole/penetration [12].

Another prior device is the "Stopper Device" of Wagner, et al., U.S. Pat. No. 6,360,779. This device is depicted in perspective view in FIG. 3. The stopper device 30 is a single molded piece, presumably made from plastic. The cap member 32 sits above the floor [10] when the device 30 is inserted into a penetration [12]. There is a cross-shaped stem 34 extending vertically down from the bottom of the cap member 32. Along the length of the stem 34 are a plurality of "radial vanes" 36. These radial vanes 36 are designed to flex (i.e. curl up) as the stem 34 is inserted into the penetration [12]. The spring force exerted against the walls of the penetration [12] by the curled vanes 36 will serve to center the device 30 on the penetration [12], and to retain it in position. There are at least two problems, however, with the Wagner device 30. First, the design of the vanes 36, while better than those of Becker, are still limited in their ability to accommodate to a wide variety hole diameters D(P)—if the hole is too small, the vanes 36 will not be able to curl sufficiently to allow the stem 34 to be inserted into the hole [12]. Also, the curled vanes 36 will create a force that opposes the removal of the device 30 from the hole [12]. This will not only make removal of the device 30 difficult, but it will tend to cause undesirable wear and tear on the vanes 36, which will lead to a shorter service life than is desirable.

Murkland, U.S. Pat. No. 6,581,361, discloses yet another version of plugs for holes in concrete floors. The Murkland "plug" has a cap and four rigid "vanes" that extend down from the cap. The Murkland plug is retained within the hole because the outer edges of the vanes are slightly farther apart than the diameter of the hole being plugged. This creates an interference fit between the vanes and the hole. The problem with this design is that each plug can only be used with a single size of hole, because if the hole is slightly smaller, the plug won't fit into it. If the hole is slightly too large, the vanes will not reach the sides of the hole, and the plug will be dangerously loose.

What is needed is a simple, low-cost, durable cover for penetrations in concrete floors that can each accommodate a range of hole diameters, and be installed and removed easily and quickly.

SUMMARY OF THE INVENTION

In light of the aforementioned problems associated with the prior devices, it is an object of the present invention to provide a Hole Cover. One size of hole cover should accommodate a wide variety of hole diameters, and fit snugly. The device should be made from a lightweight, yet durable material. A version having a cap with an internal metal core should also be available.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIGS. 4A and 4B are perspective views of a first preferred embodiment of the hole cover of the present invention;

FIGS. 6A and 6B are perspective views of a second preferred embodiment of the hole cover of the present invention;

FIG. 7 is a cutaway side view of the hole cover of FIGS. 6A and 6B installed in a penetration;

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Hole Cover.

The present invention can best be understood by initial consideration of FIGS. 4A and 4B.[1] FIGS. 4A and 4B are perspective views of a first preferred embodiment of the hole cover 40A of the present invention. This version of the hole protector 40A is designed to be molded from plastic or other durable, yet flexible material, in a single homogeneous piece, in order to keep the per-item cost low.

[1] As used throughout this disclosure, element numbers enclosed in square brackets [ ] indicates that the referenced element is not shown in the instant drawing figure, but rather is displayed elsewhere in another drawing figure.

The protector 40A is defined by a dome-shaped cap element 42A, designed to cover the penetration [12] when the protector 40A is inserted therein. A cylindrical stem 44A extends downward from the cap element 42A, preferably to a depth of approximately four (4) inches. This will allow the protector 40A to be used in all normal thicknesses of concrete floors [10]. A plurality of vertical fins 46A extend perpendicular from the stem 44A, along its length. The fins 46A are thin enough to be flexible (as will be depicted and discussed below), yet durable enough to be re-usable numerous times without fear of failure.

A standoff collar 48 may be formed between the tops of the vertical fins 46A and the bottom of the cap element 42A. The standoff collar 48 adds rigidity to the device, as well as giving the user a gap between the tops of the fins 46A and the bottom of the cap element 42A when removing the device 40A from the penetration [12].

Figure 1:
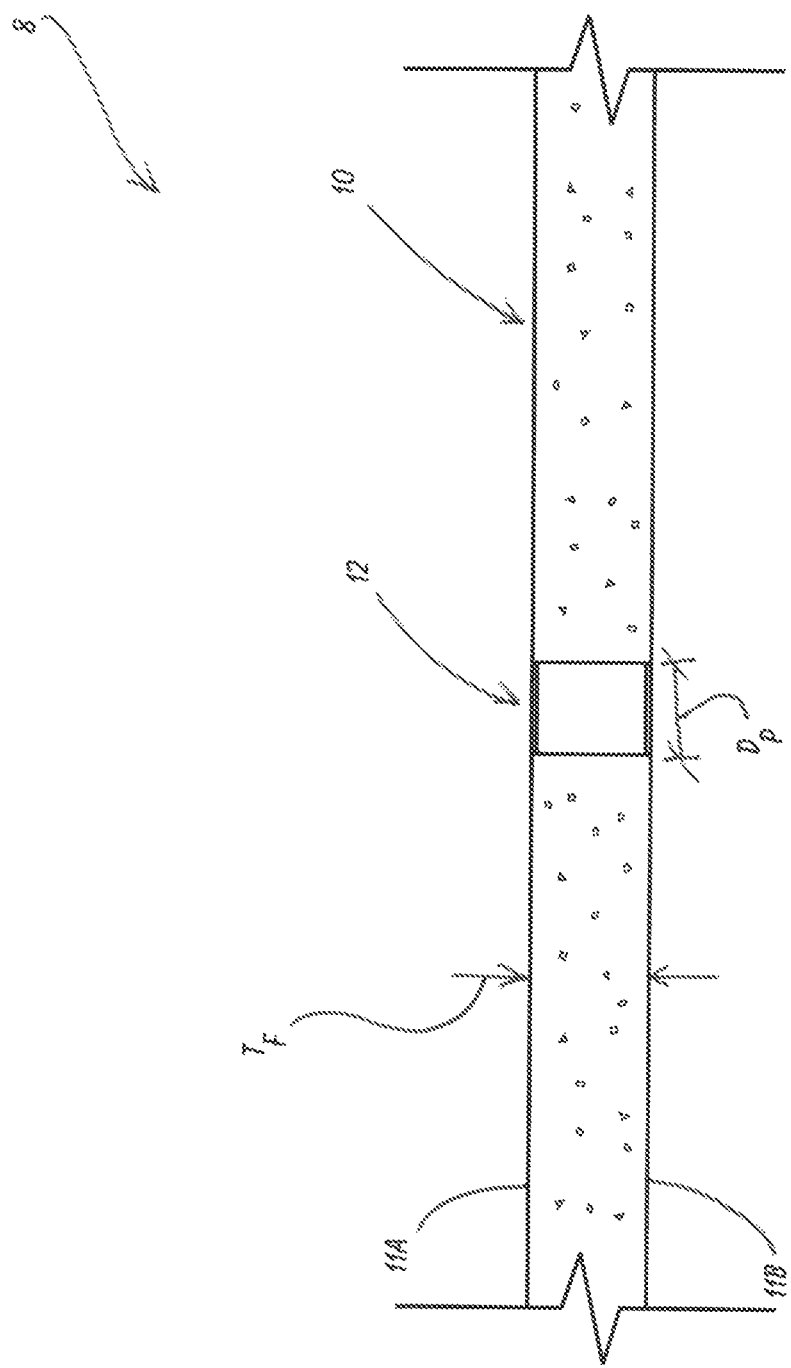
FIG. 1 is a partial cutaway side view of a typical commercial building level.
Figure 2:
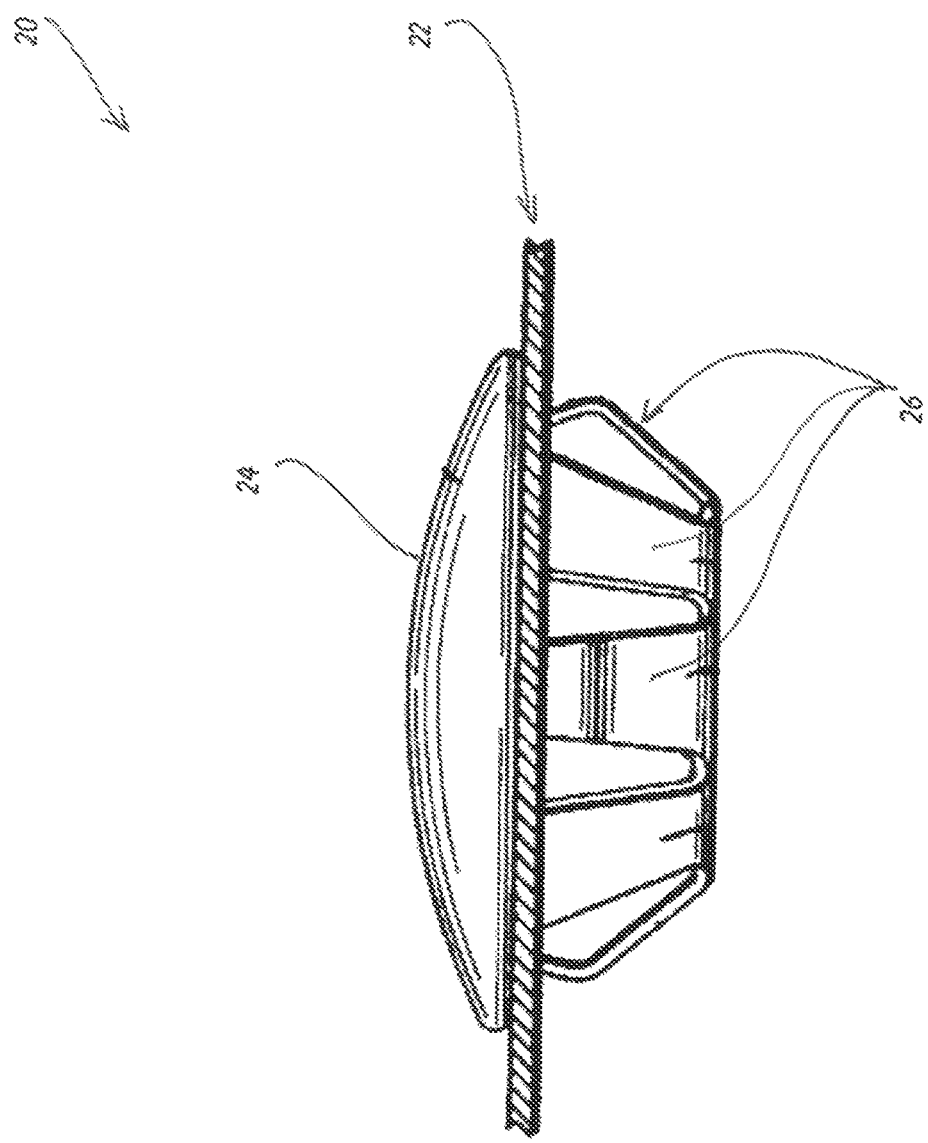
FIG. 2 is a side view of a Universal Plug Button of U.S. Pat. No. 2,552,917 to P. D. Becker.
Figure 3:
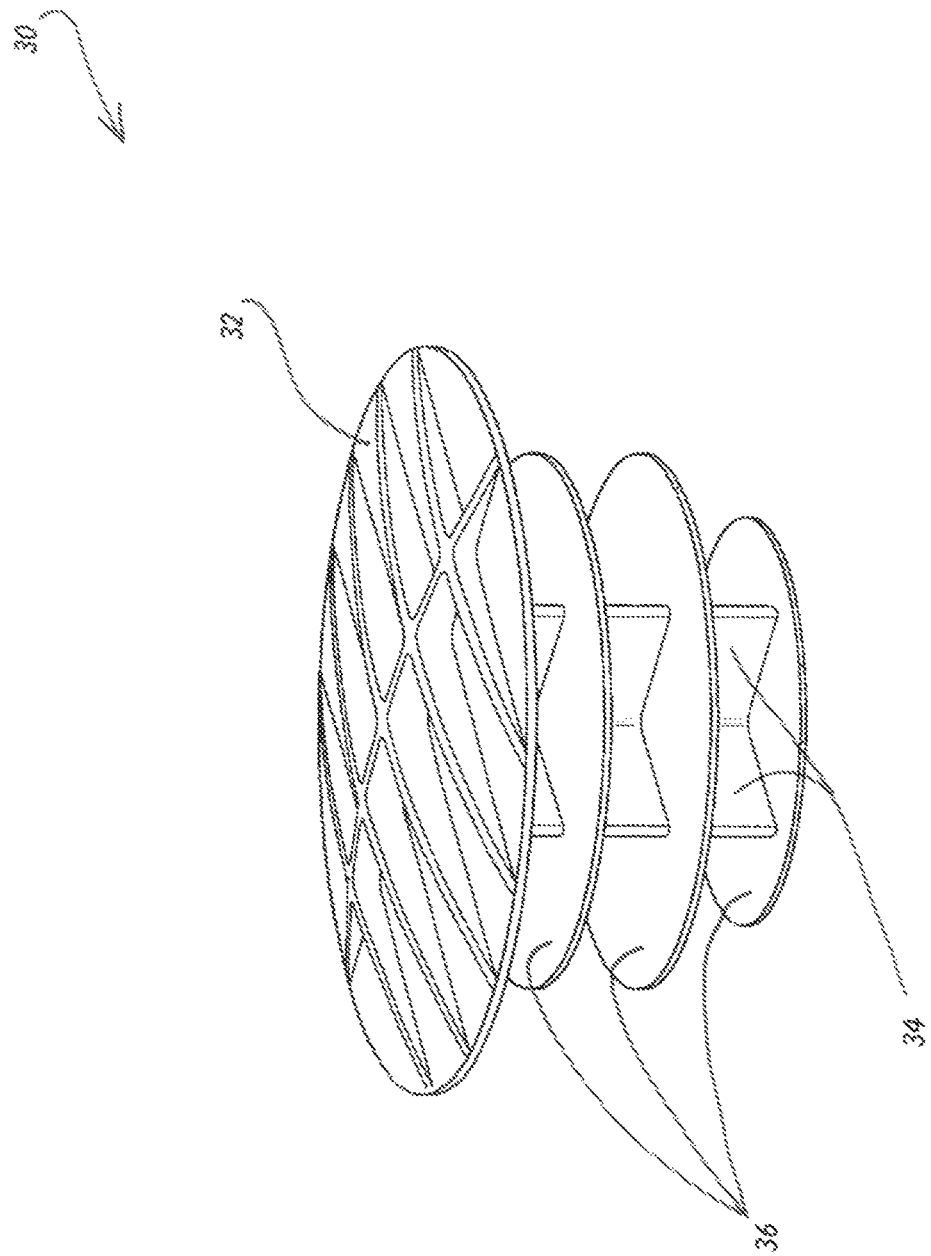
FIG. 3 is a perspective view of a Stopper Device of U.S. Pat. No. 6,360,779 to Wagner, et al.
Figure 5B:
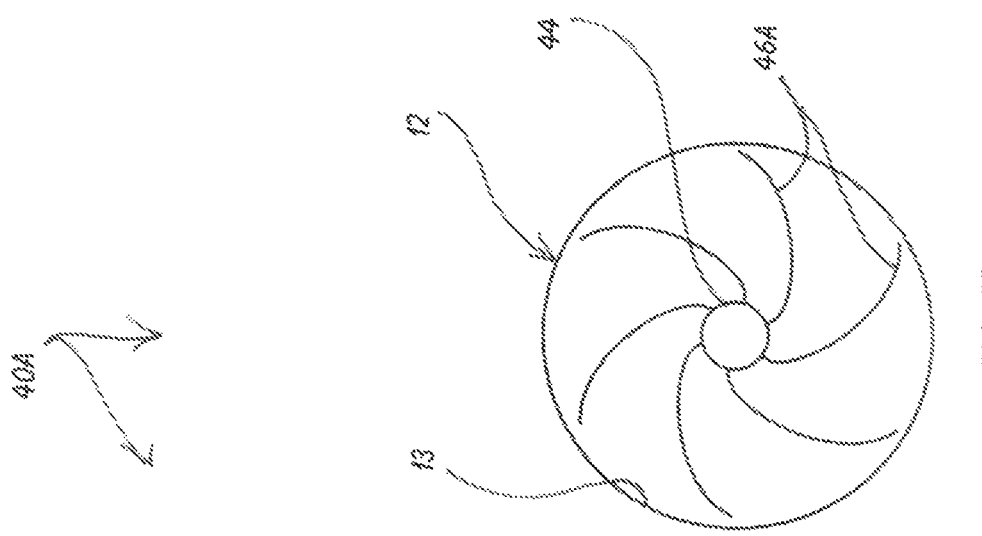
FIG. 5A is a perspective view and FIG. 5B is a cutaway top view of the hole cover of FIGS. 4A and 4B.
Figure 5A:
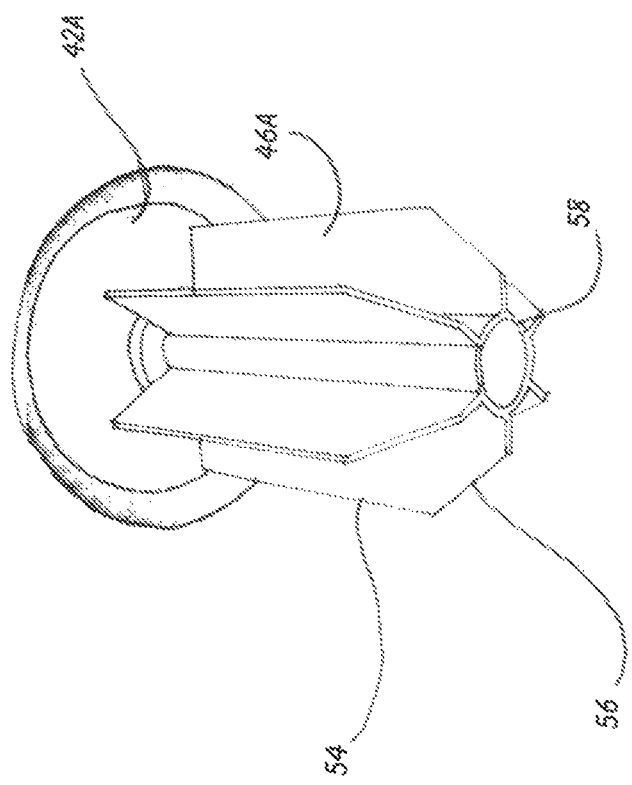

In FIG. 4B, an optional additional feature to the top of the cap element 42A is shown. In some versions, a removal bore 52, formed parallel to the top face of the cap element 42A may be provided. The bore 52 is recessed in the cap element 42A so that no trip hazard is created by any protrusion above the cap element 42A. The bore 52 is accessible from either side through the groove 50. In this way, a worker may be able to use a hook or other tool to reach down, insert into the bore 52, and then pull out the device 40A from the hole [12] without having to bend down. This feature could be quite valuable when a large number of hole protectors 40A have to be removed in quick succession. FIGS. 5A and 5B provide additional detail regarding this first embodiment of the invention.

FIG. 5A is a perspective view and FIG. 5B is a cutaway top view of the hole cover 40A of FIGS. 4A and 4B. In some versions of this embodiment 40A, the distal ends of the fins 46A have an angled end in order to make it easier to insert the end of the hole protector 40A into the hole 12. Since the diameter [D(P)] of the hole 12 is always going to be smaller than the width of the fins 46A, there will be some resistance to inserting the distal end 58 of the hole protector 40A into the hole 12. The angled leading edges of the fins 46A will serve to center the end of the protector 40A as it is being inserted into the hole 12. Each fin 46A is defined by a vertical edge portion 54. The vertical edge portion 54 transitions into an angled edge portion 56, which could be at an angle of 45 degrees from the vertical edge portion. The angled edge portion 56 then transitions again so that the bottom edge is generally perpendicular to the vertical edge portion 54, as it terminates at the distal end 58.

FIG. 5B is a cutaway top view of the fin portion of the device 40A after it has been inserted into the hole 12. Because the diameter of the penetration 12 is smaller than the diameter of the fins 46A, they will flex as the device 40A is inserted. The result is that the fins will form a spiral shape between the stem 44 and the wall 13. Each fin 46A will exert slight force outwardly against the wall 13, which will center the device 40A, and will prevent it from inadvertently being dislodged from the hole 12. Unlike the Wagner device, however, this hole protector 40A will be easy to remove from the hole 12, since the curled edges of the fins 46A do not oppose the horizontal movement of the protector 40A.

Since the fins 46A will have quite a bit of flex in them, each size of hole protector 40A will be able to accommodate a wide variety of hole diameters. It is expected that different hole protectors 40A will serve 2.5-3.5 inch holes, 3.5-5.0 inch holes, and 5.0-7.5 inch holes. This will reduce the number of different diameters of devices 40A that the job site will need to have. If we now turn to FIGS. 6A and 6B, we can examine another version of the device.

FIGS. 6A and 6B are perspective views of a second preferred embodiment of the hole cover 40B of the present invention. This version 40B is very similar to what is known as a "molly" type of hollow wall anchor. The cap element 42B has an activation bolt 64 protruding through the cap element 42B, and terminating in a bolt head 66, which is defined by a hex nut, screw head, or other tool-engagable The activation bolt threadedly engages the end element 62, which is interconnected with the cap element 42B by expandable ribs 60. The ribs 60 are defined by an upper segment 68 extending from the cap element 42B. The upper segment 68 transitions to the middle segment 70, and then the lower segment 72, which is attached to the end element 62. As the activation bolt 64 is rotated (clockwise, typically), the end element 62 will be drawn towards the cap element 42B, in direction "M." As shown in FIG. 7, after the hole protector 40B is inserted into the hole 12, the activation bolt 66 is rotated until the end element 62 draws towards the cap element 42B until the middle segments 70 press against the walls 13. The bolt 66 is turned until the point where there is sufficient force exerted against the wall 13 by the middle segment 70 to securely hold the device 40B in place. In order to remove the device 40B from the hole 12, the activation bolt is turned by the bolt head 66 (counterclockwise) until the middle segments 70 recede from the wall 13. Finally, turning to FIG. 8, we can examine yet another version of the present invention.

Figure 8:
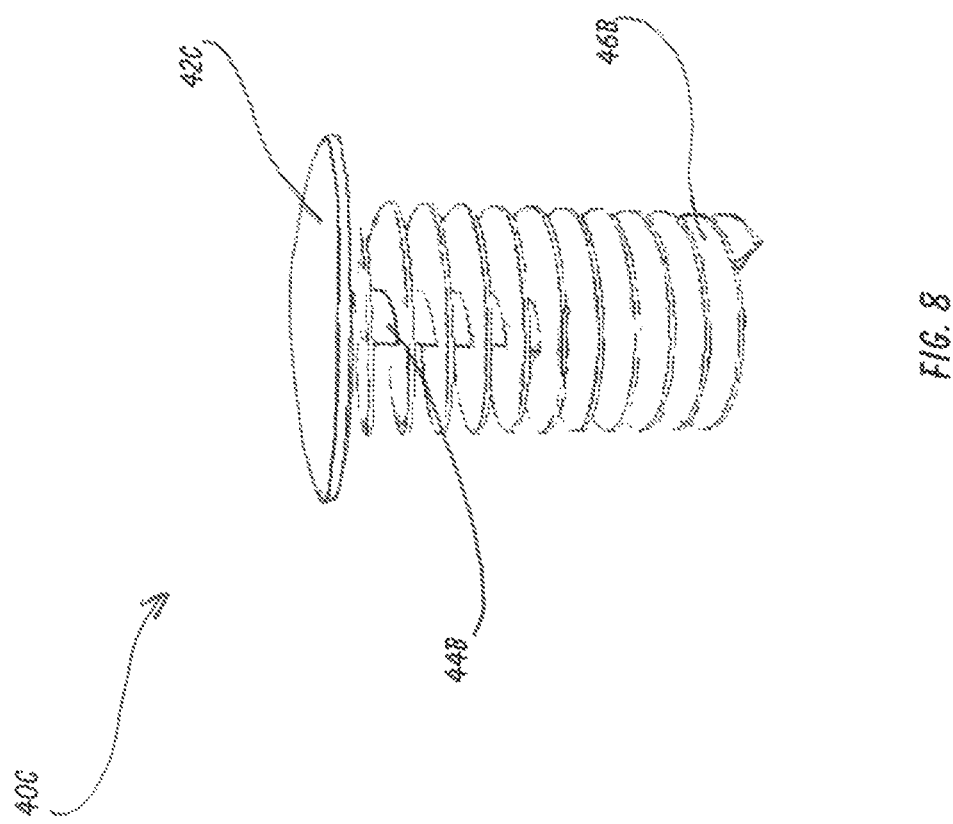
FIG. 8 is a perspective view of a third preferred embodiment of the hole cover of the present invention.

FIG. 8 is a perspective view of a third preferred embodiment of the hole cover 40C of the present invention. This design is a variation of the first embodiment [40A], but rather than having vertically-aligned fins, this fin 46B is a spiral in shape. This hole protector 40C is inserted into the hole [12] in the same way as the first embodiment [40A], as well as the Wagner device. Like the Wagner device, the spiral fin 46B will curl up as it impinges against the wall [13] of the hole [12]. Unlike the Wagner device, however, this device is more easily removed. The user needs to simply twist the cap element 42C while pulling up on it. The twisting motion will "unscrew" the device 40A from the hole [12], rather than creating damaging force against the tips of the curled fin 46B. Of course, in order to insert the device 40A into a penetration 12, the user also twists the cap 42A in one direction or the other as the fins 46A are inserted into the penetration 12. If we turn now to FIGS. 9A and 9B, we can see the internal structure of the device of FIGS. 4A/4B and 5A/5B.

Figure 9A:
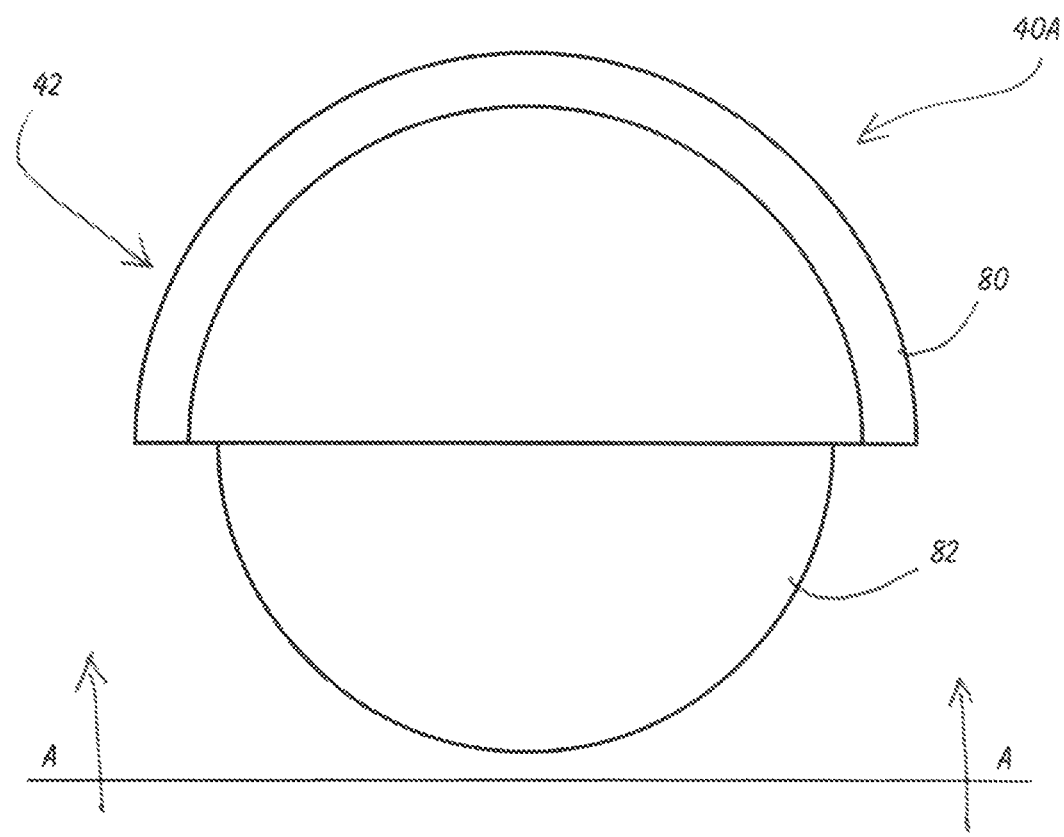
FIGS. 9A and 9B are partial cutaway top and side views of the first preferred embodiment of the hole cover of the present invention.
Figure 9B:
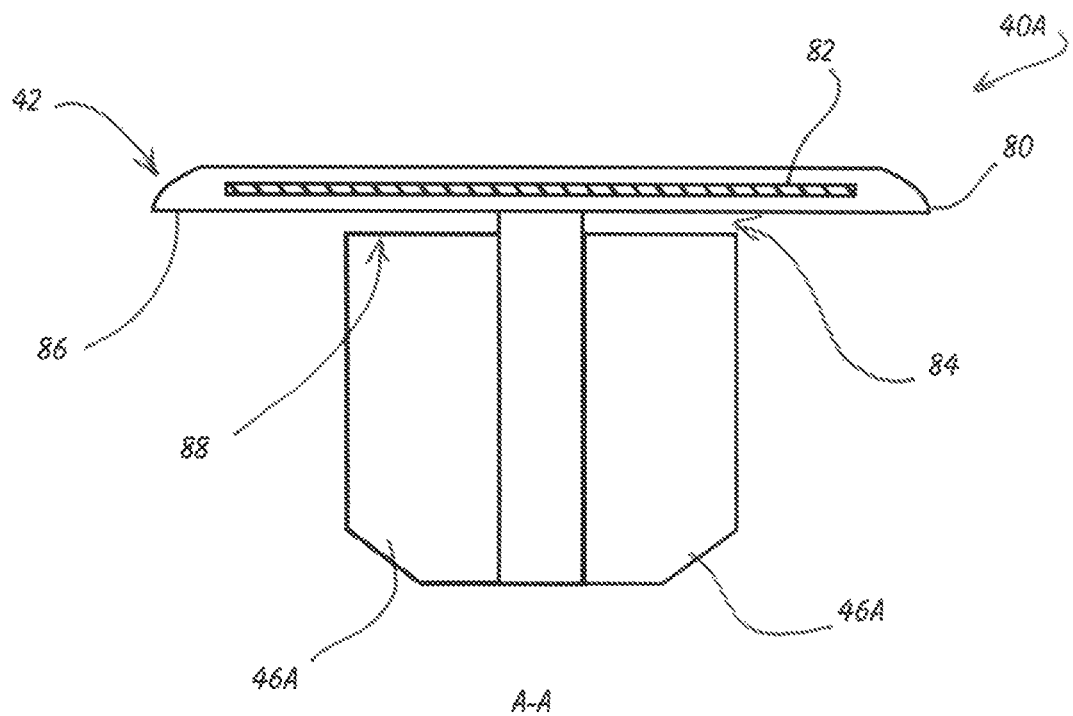

FIGS. 9A and 9B are partial cutaway top and side views of the first preferred embodiment 40A of the hole cover of the present invention. Where larger holes [12] mandate larger plugs, it becomes necessary to provide additional strength in the cap element 42. Consequently, in versions of the device 40A designed to plug holes larger than 3.5 inches in diameter, the cap element 42 has an inner core 82 made from a material other than the rest of the device 40A. In the depicted version, the core 82 is made from steel, although other materials could be employed, including aluminum. The device 40A is molded so that the outer shell 80 of the cap 42 encases the cap element. This is easily seen in FIG. 9B.

FIG. 9B also shows that the upper edge 88 of the fins 46A (there are typically 6 fins) are not connected to the bottom face 86 of the cap element 42. Unlike the Murkland device, there is a gap 84 between the upper edges 88 and the bottom face 86, so that the fins 46A can deflect as depicted in FIG. 5B. In this version, there is no standoff collar [48] between the fins 46A and the cap element 42A.

Figure 10:
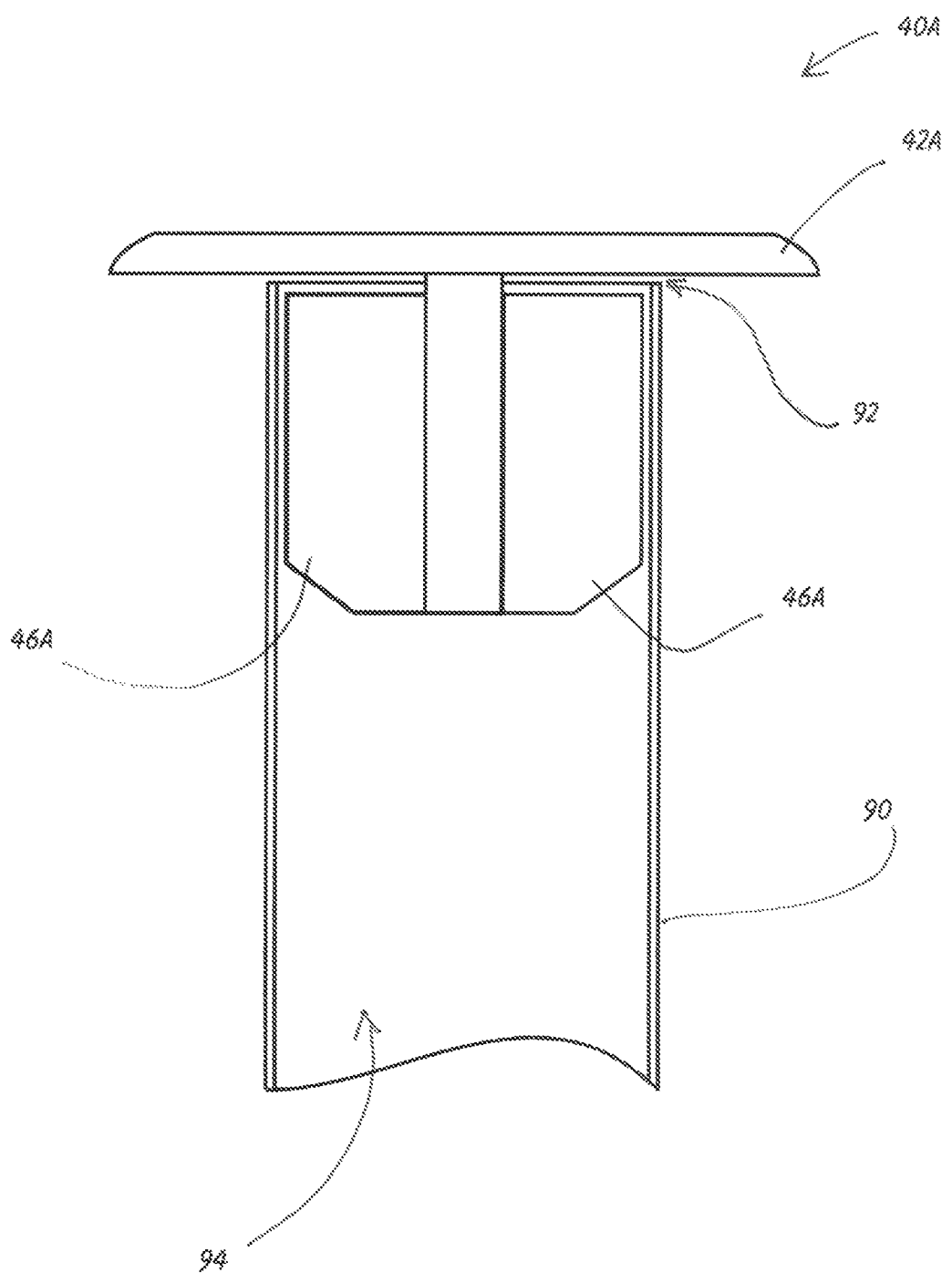
FIG. 10 is a side view of thereof employed for an alternate purpose.

FIG. 10 is a side view of the hole protector 40A being employed for an alternate purpose. In this case, the protector 40A is being used to cap off the end of a piece of pipe 90. The pipe 90 could be related to plumbing, electrical, or even structural reinforcement. It has been discovered that the protector 40A is very suitable to be used as a protective cover for protruding things like piping in order to prevent harm to workers and to the pipe 90 itself. The user need simply select the appropriately-sized device 40A so that the fins 46A will fit into the internal diameter of the pipe segment 90 (usually with twisting as described above in connection with FIG. 5B). The tip 92 will then be protected by the cap 42A of the protector 40A. As such, the bore 94 of the pipe 90 is interchangeable herein anywhere "penetration" or "hole" 12 is used, including in the attached Claims.

It is believed that the hole plug of the present invention conforms to OSHA safety regulations regarding holes in floors and walls and fall protection for pipes and conduit that protrude up and out from said floors and walls (no formal certification has been completed as of this writing). The hole plug that will self-adjust to fit a variety of holes pipes and conduit within a given size range of the specific size hole plug that is easy to install and remove and that is reusable.

It is further believed that the device conforms to OSHA regulations where the edge of the hole plug is at a 30 degree angle from a horizontal plane (i.e. the peripheral lip of the cap element [42]). The hole plug top will support twice the weight of persons or objects that may traverse across the top of the hole plug.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A device for removably plugging a hole through a substrate defined by a top surface, said hole selected from a group of holes ranging in diameters between a first diameter and a second larger diameter, the device comprising:
   a generally flat cap element defined by a top surface and a bottom surface and a peripheral edge defining a cap diameter, said cap diameter being greater than said first and second said diameters of said holes in said group, said cap element comprising a rigid core element substantially encased within vinyl, rubber or plastic;
   an elongate stem element extending generally perpendicularly from said cap element bottom surface;
   four or more fin elements extending radially from said stem in relative radial spaced relation to each other, each said fin having an upper edge, said upper edge separated from said cap element bottom surface by a gap; and
   each of said fin elements is formed from thin flexible material, whereby said fin elements bend in a spiral fashion parallel to said elongate stem when said elongate stem and fins are inserted into one of said holes in said group of holes defined by diameters between said first and said second larger diameter.

2. The device of claim 1, wherein said stem element, and said fin elements are formed from vinyl, rubber or plastic.

3. The device of claim 1, wherein said fin elements extend outwardly from said stem elements and terminate in outer vertical edges, said outer vertical edges defining a fin diameter, said fin diameter being greater than the largest diameter of said holes in said group.

4. The device of claim 3, wherein said vinyl, rubber or plastic comprising said fin elements permits said fin elements to deform so that said fin elements can be inserted into a hole of said group of holes defining the smallest said diameter of said group of holes.

5. The device of claim 1, wherein said stem element comprises an outer wall from which said fin elements extend, and a central bore substantially along its length, and further said fin elements are rigidly and non-retractably attached to said stem element outer wall.

6. The device of claim 1, wherein said cap element defines an upwardly-domed top surface and further comprises a pair of transverse grooves formed therein on either end of a transverse removal bore formed in said cap element, whereby said grooves and said removal bore are beneath the upwardly-domed top surface of said cap element.

7. A device for removably plugging a hole through a substrate defined by a top surface, said hole diameter, the device comprising:
   a generally flat cap element defined by a top surface and a bottom surface and a peripheral edge defining a cap diameter, said cap diameter being greater than said hole diameter;
   an elongate hollow stem element extending generally perpendicularly from said cap element bottom surface, said hollow stem defining an outer wall having an outer diameter width and an hollow center; and three or more fin/rib elements extending radially outward from said elongate hollow stem element in relative radial spaced relation to each other, each said fin/rib element defining an upper edge and an outer edge, said upper edge separated from said cap element bottom surface by a gap, and said outer edges of said fin/rib elements defining a diameter that is greater than said hole diameter; and each of said fin elements is formed from thin flexible material, each said fin element defining a width that is greater than said hollow stem outer diameter width, whereby said fin elements bend in a spiral fashion parallel to said elongate stem when said elongate stem and fins are inserted into said hole.

8. The device of claim 7, wherein said cap element, said stem element, and said fin/rib elements are formed from vinyl, rubber or plastic.

9. The device of claim 7, wherein said fin elements are rigidly and non-retractably attached to said elongate stem element outer wall.

10. The device of claim 9, wherein said cap element further defines a dome-shaped top surface and comprises a pair of transverse grooves formed therein on either end of a transverse removal bore formed in said cap element such that said pair of transverse grooves and said removal bore are beneath said dome-shaped top surface of said cap element.

11. The device of claim 7, wherein said cap element further defines a dome-shaped top surface and comprises a pair of transverse grooves formed therein on either end of a transverse removal bore formed in said cap element such that said pair of transverse grooves and said removal bore are beneath said dome-shaped top surface of said cap element.

12. The device of claim 11, wherein said cap element, said stem element, and said fin/rib elements are formed from vinyl, rubber or plastic.

* * * * *